(12) United States Patent
Grant et al.

(10) Patent No.: US 7,902,287 B2
(45) Date of Patent: Mar. 8, 2011

(54) POLYAMIDE RESIN COMPOSITION AND METHOD OF PREPARING

(75) Inventors: William E. Grant, Angleton, TX (US); Norman S. Terrell, Lake Jackson, TX (US); Robert G. Corry, Manvel, TX (US); Eric S. Noon, Flat Rock, MI (US); Cesar G. Ortiz, Pearland, TX (US)

(73) Assignee: BASF Aktiengesellschaft, Ludwigshafen (DE)

( * ) Notice: Subject to any disclaimer, the term of this patent is extended or adjusted under 35 U.S.C. 154(b) by 13 days.

(21) Appl. No.: 12/017,267

(22) Filed: Jan. 21, 2008

(65) Prior Publication Data

US 2009/0186971 A1    Jul. 23, 2009

(51) Int. Cl.
| | |
|---|---|
| C08G 69/26 | (2006.01) |
| C08G 18/67 | (2006.01) |
| C08G 69/48 | (2006.01) |
| C08K 5/20 | (2006.01) |
| C08K 5/34 | (2006.01) |
| C08K 5/35 | (2006.01) |
| C08K 3/10 | (2006.01) |
| C08K 3/22 | (2006.01) |
| C08K 5/09 | (2006.01) |
| C08K 5/10 | (2006.01) |
| C08L 51/00 | (2006.01) |
| C08L 69/00 | (2006.01) |
| C08L 77/00 | (2006.01) |
| B32B 27/28 | (2006.01) |
| C08F 283/04 | (2006.01) |
| B01D 19/04 | (2006.01) |
| C10L 1/14 | (2006.01) |

(52) U.S. Cl. .......... 524/538; 524/227; 524/98; 524/537; 524/413; 524/300; 525/420; 525/432; 508/202; 508/459

(58) Field of Classification Search .................. 524/538; 525/420, 432
See application file for complete search history.

(56) References Cited

U.S. PATENT DOCUMENTS

| | | | | |
|---|---|---|---|---|
| 2,922,727 | A * | 1/1960 | Levison ........................ 427/394 |
| 4,335,223 | A * | 6/1982 | Flood et al. .................... 525/179 |
| 5,000,889 | A | 3/1991 | Hamano et al. | |
| 5,283,282 | A * | 2/1994 | Hamada et al. ............. 525/92 B |
| 5,731,075 | A | 3/1998 | Goto et al. | |
| 5,741,601 | A | 4/1998 | Kishida et al. | |
| 5,763,561 | A * | 6/1998 | Keske ............... 528/310 |
| 6,093,788 | A * | 7/2000 | Born et al. ............ 528/310 |
| 6,103,805 | A | 8/2000 | Kojima et al. | |
| 6,121,388 | A | 9/2000 | Umetsu et al. | |
| 6,156,838 | A | 12/2000 | Yoshikawa et al. | |
| 6,423,776 | B1 | 7/2002 | Akkapeddi et al. | |
| 6,685,861 | B2 | 2/2004 | Akkapeddi et al. | |
| 6,740,698 | B2 | 5/2004 | Akkapeddi et al. | |
| 6,894,100 | B2 * | 5/2005 | Miyoshi et al. ............... 524/424 |
| 7,358,285 | B2 * | 4/2008 | Ottenheijm ................... 524/100 |
| 2003/0004248 | A1 | 1/2003 | Wakamura et al. | |
| 2003/0050376 | A1 * | 3/2003 | Oka et al. ........................ 524/413 |
| 2006/0014866 | A1 * | 1/2006 | Ottenheijm ................... 524/115 |
| 2008/0090945 | A1 * | 4/2008 | Langrick et al. ................ 524/94 |
| 2008/0152885 | A1 * | 6/2008 | Miyoshi et al. ............... 428/220 |
| 2008/0262133 | A1 * | 10/2008 | Eibeck et al. ................. 524/186 |

FOREIGN PATENT DOCUMENTS

| | | | |
|---|---|---|---|
| CA | 2256100 | * | 1/1999 |
| GB | 1224586 | * | 7/1969 |
| JP | 06128480 | * | 10/1992 |
| WO | WO-2006/057254 A1 * | | 1/2006 |
| WO | WO-2006/084862 A1 * | | 8/2006 |

OTHER PUBLICATIONS

Fang, X., Simone, C. D., Vaccaro, E., Huang, S. J., Scola, D. A. Ring-Opening Polymerization of epsilon-Caprolactam and epsilon-Caprolactone via Microwave Irradiation. Journal of Polymer Science: Part A: Polymer Chemistry, vol. 40, p. 2267-2275 (2002).*
The Kirk-Othmer Encyclopedia of Chemical Technology: Polyamides, General, 2000.*

* cited by examiner

*Primary Examiner* — Vasu Jagannathan
*Assistant Examiner* — Anthony H Sheh
(74) *Attorney, Agent, or Firm* — Howard & Howard Attorneys PLLC

(57) ABSTRACT

The present invention provides a polyamide resin composition and a method of preparing the composition. The composition includes a first polyamide resin, a second polyamide resin different from the first, a transition metal, and a lubricant. The first polyamide resin has an extractable fraction of nylon 6 oligomer at least one percent as determined by ISO 6427. The composition is optimized for relative viscosity, viscosity number, moisture content, and an amount of extractables.

29 Claims, No Drawings

POLYAMIDE RESIN COMPOSITION AND METHOD OF PREPARING

FIELD OF THE INVENTION

The present invention generally relates to a polyamide resin composition. More specifically, the present invention relates to a polyamide resin composition including a first polyamide having a specific extractable fraction, a second polyamide, a transition metal, and a lubricant. The present invention also relates to a method of preparing the polyamide resin composition.

DESCRIPTION OF THE RELATED ART

Polyamide resin compositions, such as those formed from polycaprolactam, are well known in the art and are used in products such as engineering plastics in automobiles, electrical housings, electronic appliances, and building materials. However, many of these known polyamide resin compositions must be doped with caprolactam to achieve acceptable physical properties and form useable products. As an example, the known polyamide resin compositions may be doped with caprolactam to adjust physical properties such as gloss and texture and to lower glass transition temperatures. Further, caprolactam may be used to soften the polyamide resins and ease flow through extruders. Although useful, this doping is a time-consuming and expensive step and adds to the cost and complexity of forming and using the polyamide resin compositions. Specifically, caprolactam melts at approximately 70° C. and tends to agglomerate. This potential agglomeration increases handling and production costs, increases production complexities, and reduces commercial desirability.

There are other polyamide resin compositions known in the art that are not doped with caprolactam. Some of these include a mixture of nylon homopolymers and/or copolymers, heat stabilizers, and additives including lubricants. However, these polyamide resin compositions have low levels of nylon 6 oligomers and/or caprolactam, e.g. extractable fractions of caprolactam of less than one percent. As such, these polyamide resin compositions tend to lack the desirable gloss and flexibility qualities that are achieved with the doped composition, albeit at increased cost.

Accordingly, there remains an opportunity to form a polyamide resin composition that is not doped with caprolactam but exhibits customizable physical properties. There also remains an opportunity to prepare a polyamide resin composition that resists agglomeration and that easily flows in mixers and extruders.

SUMMARY OF THE INVENTION AND ADVANTAGES

The present invention provides a polyamide resin composition including a first polyamide resin, a second polyamide resin, a transition metal, and a lubricant. The first polyamide resin has an extractable fraction of nylon 6 oligomer of at least one percent as determined by ISO 6427. The second polyamide resin is different from the first polyamide resin. The present invention also relates to a method of preparing the polyamide resin composition that includes the steps of providing the first polyamide resin and combining the first polyamide, the second polyamide, the transition metal, and the lubricant to prepare the polyamide resin composition.

The resin composition of the instant invention is optimized for relative viscosity, viscosity number, moisture content, and an amount of extractables. Through modification of amounts of the first and second polyamide resins, the transition metal, and the lubricant, the resin composition can be optimized to achieve excellent performance characteristics in thermoplastic high heat resistant nylon coated wire (THHN) applications, thermoplastic heat and water resistant nylon coated (THWN) applications, and thermoplastic flexible fixture wire nylon jacketed (TFFN) applications. This modification also allows the polyamide resin composition to be easily customized to exhibit a balance of gloss, texture, flexibility, toughness, and abrasion resistance combined with chemical resistance to gasoline, oil, and other hydrocarbons in a variety of applications.

The polyamide resin composition is prepared in a cost effective manner which minimizes costs associated with doping compositions with caprolactam, reduces costs associated with shipping compositions that agglomerate with heat, and reduces an amount of equipment needed, thereby reducing capital expenditures in addition to operating and maintenance costs.

DETAILED DESCRIPTION OF THE INVENTION

The instant invention provides a polyamide resin composition, hereafter simply referred to as a "composition," and a method of preparing the composition, described in greater detail below. The composition includes a first polyamide resin having an extractable fraction of nylon 6 oligomer of at least one percent as determined by the International Organization for Standardization (ISO) testing method 6427. As understood by those skilled in the art, nylon 6 oligomers which relate to the composition and method of this invention include, but are not limited to, caprolactam, cyclic dimers, cyclic trimers, cyclic tetramers, and cyclic pentamers through octamers. That is, these are all high molecular weight derivatives of caprolactam.

In one embodiment, the first polyamide resin has an extractable fraction of nylon 6 oligomer of approximately 10 percent, as determined by ISO 6427. In another embodiment, the first polyamide resin has an extractable fraction of nylon 6 oligomer of at least 10 percent, as determined by ISO 6427. Preferably, the first polyamide resin has an extractable fraction of nylon 6 oligomer of from 1 to 20, more preferably of from 5 to 20, still more preferably of from 10 to 20, and most preferably of from 10 to 14, percent, as determined by ISO 6427. As is well known in the art, ISO 6427 includes a determination of extractable fraction of nylon 6 oligomer at 25° C. in methanol.

The first polyamide resin may be any known in the art having an extractable fraction of nylon 6 oligomer of at least one percent as determined by ISO 6427. Suitable non-limiting examples of the first polyamide resin include polycaprolactam (nylon 6), polyhexamethylenadipamide (nylon 66), polytetramethylenadipamide (nylon 46), polyhexamethylenesebacamide (nylon 610), polyhexamethylenedodecamide (nylon 612), polynonanemethyleneterephthalamide (nylon 9T), polyhexamethylenadipamide/polyhexamethyleneterephthalamide copolymer (nylon 66/6T), polyhexamethyleneterephthalamide/polycapramide copolymer (nylon 6T/6), polyhexamethylenadipamide/polyhexamethylenisophthalamide copolymer (nylon 66/6I), polydodecamide/polyhexamethyleneterephthalamide copolymer (nylon 12/6T), polyhexamethylenadipamide/polyhexamethyleneterephthalamide/polyhexamethylenisophthalamide copolymer (nylon 66/6T/6I), polyhexamethyleneterephthalamide/polyhexamethylenisophthalamide copolymer (nylon 6T/6I), polyhexamethyleneterephthalamide/poly(2-methylpentamethyleneterephthalamide) copolymer (nylon 6T/M5T), polyxylylenadipamide (nylon XD6), copolymers thereof, dimers, trimers, tetramers, and oligomers thereof, and mixtures thereof. Preferably, the first polyamide resin includes a polycaprolactam (nylon 6). A particularly suitable polycaprolactam (nylon 6) for use as the first polyamide resin is produced by BASF Corporation of Freeport, Tex. under the name Ultramid® B25 M 01.

The first polyamide resin preferably has a relative viscosity (RV) of from 2.0 to 3.0, more preferably of from 2.1 to 2.8, even more preferably of from 2.2 to 2.7, and most preferably of from 2.3 to 2.6, as determined by ISO 307 calculated by the Huggins method. According to ISO 307, relative viscosity is determined at 25° C. by 1% [m/v] of the first polyamide resin in 96% [m/m] sulfuric acid. The first polyamide resin also preferably has a viscosity number (VN) of from 100 to 170, more preferably of from 100 to 160, even more preferably of from 110 to 150, and most preferably of from 116 to 140, ml/g as determined by ISO 307. According to ISO 307, viscosity number is determined at 25° C. by 0.5% [m/v] of the first polyamide resin in 96% [m/m] sulfuric acid. Further, the first polyamide resin preferably has a maximum moisture content of 0.5, more preferably of 0.35, and most preferably 0.27% [m/m], as determined by ISO 15512. Additionally, in certain embodiments, the first polyamide resin has a melting point of 220° C. Further, the first polyamide resin may have a density of 1.12 to 1.13 g/cm$^3$. The first polyamide resin may be present in the composition in any amount provided the other components are present, but is preferably present in an amount of from 20 to 30, more preferably of from 22 to 28, and most preferably of from 24 to 26, parts by weight per 100 parts by weight of the composition.

The composition also includes a second polyamide resin. The second polyamide resin is different from the first polyamide resin, may be any known in the art, and may include any of the aforementioned polyamide resins, so long as it is different from the first polyamide resin. Preferably, the second polyamide resin includes a polycaprolactam (nylon 6). A particularly suitable polycaprolactam (nylon 6) for use in the second polyamide resin is produced by BASF Corporation of Freeport, Tex. under the name of Ultramid® B32 LX 01. In one embodiment, the second polyamide resin preferably has an extractable fraction of amide (e.g. nylon 6 oligomer) of less than 1.5, more preferably of less than 1.0, and most preferably of less than 0.6, percent, as determined by ISO 6427.

The second polyamide resin preferably has a relative viscosity (RV) of from 2.3 to 5.0, more preferably of from 3 to 3.5, even more preferably of from 3 to 3.3, and most preferably of from 3.09 to 3.22, as determined by ISO 307 calculated by the Huggins method. The second polyamide resin also preferably has a viscosity number (VN) of from 160 to 320, more preferably of from 160 to 200, even more preferably of from 170 to 190, and most preferably of from 179 to 189, ml/g, as determined by ISO 307. Further, the second polyamide resin preferably has a moisture content of less than 0.1 and more preferably of less than 0.06, % [m/m], as determined by ISO 15512. Additionally, in certain embodiments, the second polyamide resin has a melting point of from 210 to 230, more preferably of from 215 to 225, and most preferably of from 218 to 222, ° C. The second polyamide resin may have a density of 1.12 to 1.13 g/cm$^3$. Although not required, the second polyamide resin is preferably present in the composition in an amount of from 70 to 90, more preferably of from 70 to 75, and most preferably of from 73 to 74, parts by weight per 100 parts by weight of the composition.

In addition to the first and second polyamide resins, the composition may also include an additional polyamide resin, i.e., a third polyamide resin. The third polyamide resin may include any of the aforementioned amides so long as it is different from the first and second polyamide resins. In one embodiment, the third polyamide resin includes a nylon 6 that is produced by BASF Corporation of Freeport, Tex. under the name of Ultramid® B27 E 01. Additionally, the third polyamide resin may include metal salts including, but not limited to, alkali metals and alkali earth metals. In one embodiment, the third polyamide resin includes potassium salts.

The composition also includes a transition metal. The transition metal may be included as a component of the first, second, and/or third polyamide resins or may be added to the composition separately from any of the polyamide resins. In one embodiment, the transition metal is included as a component of the third polyamide resin as a transition metal salt such as a copper(II) salt. The transition metal preferably functions as a heat stabilizer in the composition and may be included in the composition in any form including, but not limited to, ultra fine particles having a particle size of less than 1,000 nm. The transition metal is typically in a mixture and may be present elementally or as a compound including, but not limited to, fluorides, chlorides, bromides, iodides, sulfates, nitrates, phosphates, acetates, salicylates, stearates, benzoates, xylylenediamines, 2-mercaptobenzimidazoles, benzimidazoles, and mixtures thereof. The transition metal may be selected from any of the well known transition metals known in the art, e.g. any element in the d-block of the periodic table. More preferably, the transition metal includes a Group I-B transition metal such as copper, silver, and/or gold. Most preferably, the transition metal includes copper (Cu). The copper is preferably present as copper iodide, e.g. cuprous iodide (CuI) and/or cupric iodide ($Cu_2I_2$). Alternatively, the copper may be present as a cuprous chloride, cupric chloride, cuprous bromide, cupric bromide, cupric sulfate, cupric nitrate, copper phosphate, cuprous acetate, cupric acetate, cupric salicylate, cupric stearate, cupric benzoate, and/or as a complex with a xylylenediamine, a 2-mercaptobenzimidazole, a benzimidazole, and mixtures thereof. The transition metal is preferably present in the composition in an amount of from 10 to 150, more preferably of from 10 to 100, and most preferably of from 30 to 85, parts by weight per one million parts by weight of the composition. In one embodiment, the transition metal is present in an amount of from 0.4 to 0.8 parts by weight per 100 parts by weight of said composition.

An alkali halide may also be included in the composition in addition to the transition metal. Suitable non-limiting examples of alkali halides include lithium chloride, lithium bromide, lithium iodide, potassium chloride, potassium bromide, potassium iodide, sodium bromide, sodium iodide, and mixtures thereof.

In addition to the transition metal, the composition also includes a lubricant. The lubricant may be any known in the art including, but not limited to, polyalkylene waxes, aliphatic amides, salts of fatty acids, silicones, and mixtures thereof. Most preferably, the lubricant is selected from the group of salts of fatty acids, silicones, and mixtures thereof. In one embodiment, the lubricant includes a fatty acid. In another embodiment, the lubricant includes a combination of a N,N'-ethylenebis(stearamide) wax and a silicone oil. The N,N'-ethylenebis(stearamide) wax is commercially available from Lonza, Inc. under the trade name of ACRAWAX® C-V. The silicone oil is commercially available from Dow Corning Corporation of Midland, Mich., under the trade name Dow Corning 200® Fluid. The lubricant is preferably present in the composition an amount of from 100 to 10,000, more preferably of from 400 to 2,000, and most preferably of from 400 to 1,200, parts by weight per one million parts by weight of the composition. In one embodiment, the lubricant includes the combination of the N,N'-ethylenebis(stearamide) wax and the silicone oil with the wax present in an amount of approximately 800 parts by weight per one million parts by weight of the composition and the silicon oil present in an amount of approximately 400 parts by weight per one million parts by weight of the composition.

Further, the composition may include water, i.e., moisture. Preferably, the composition includes less than 1%, more preferably of less than 0.75%, even more preferably of from 0.2 to 0.5%, and most preferably of from 0.05 to 0.5%, by weight of moisture. However, it is contemplated that the composition may include any amount of moisture, as selected by one of skill in the art.

In one embodiment, the composition includes the first polyamide resin including Ultramid® B25 M, the second polyamide resin including Ultramid® B32 LX, the third polyamide resin including Ultramid® B27 E, the transition metal including copper, and the lubricant including a combination of a N,N'-ethylenebis(stearamide) wax and a silicone oil. The composition of this embodiment has a relative viscosity (RV) of from 2.8 to 3, as determined by ISO 307 calculated by the Huggins method. This composition also has a viscosity number (VN) of from 157 to 172, ml/g as determined by ISO 307. Further, this composition has a moisture content of less than 0.17% [m/m], as determined by ISO 15512. Still further, this composition has a melting point of approximately 220° C. as determined by ISO 3146, a density of approximately 1.13 g/cm³ as determined by ISO 1183, a bulk density of approximately 700 kg/m³, a water absorption at 23° C./50% relative humidity of approximately 2.7%, and a water absorption saturation in water at 23° C. of approximately 9.5%. This composition also has an extractable fraction of caprolactam (nylon 6) of from 2.5 to 5.5% [m/m] as determined by ISO 6427 with chips not ground/16 h. Additionally, this composition has a tensile strength at yield of approximately 73 MPa, an elongation at yield of approximately 4.25% m and a tensile modulus of approximately 2,500 MPa, each determined by ISO 527. The composition also has a flexural modulus at 23° C. of approximately 2230 MPa and a flexural modulus at 121° C. of approximately 290 MPa, each determined by ISO 178. Further, the composition has an izod notched impact strength at 23° C. of approximately 40 J/m, and an izod notched impact strength at −40° C. of approximately 26 J/m, each determined by ISO 179.

The composition of the instant invention may be used in a variety of applications and may be formed into an article of any shape and structure. In one embodiment, the article is a film. The composition may also be used in a variety of products including, but not limited to, electrical housings, electronic appliances, sensors, LEP lamps, connectors, sockets, resistors, relay cases, switches, bobbins, capacitors, optical pickups, oscillators, plates, transformers, plugs, circuit boards, tuners, speakers, microphones, headphones, motors, magnetic head bases, power modules, semiconductors, liquid crystal displays, FDD carriages, FDD chassis, HDD parts, motor brush holders, parabolic antennas, computer-related parts, irons, hair driers, kitchen appliances, air conditioners, typewriters, word processors, telephones, facsimiles, duplicators, oil-less bearings, stem bearings, underwater bearings, microscopes, binoculars, cameras, watches, alternator terminals, alternator connectors, IC regulators, valves, nozzles, manifolds, fuel pumps, engine-cooling water joints, carburetors, thermostats, water pump impellers, turbine veins, wipers, distributors, starter switches, starter relays, wire harnesses, switch boards, coils, insulating boards, rotors, sockets, reflectors, pistons, filters, conductor jacketing including shipboard cable, non-metallic sheathed cable primary jacketing, thermoplastic high heat resistant nylon coated wire (THHN) applications, thermoplastic heat and water resistant nylon coated (THWN) applications, thermoplastic flexible fixture wire nylon jacketed (TFFN) applications, and mixtures thereof. In one embodiment, the article is used in a coated wire application in conjunction with polyvinyl chloride.

The present invention also provides a method of preparing the composition. The method includes the step of providing the first polyamide resin and the step of combining the first polyamide resin, the second polyamide resin, the transition metal, and the lubricant. In one embodiment, this is accomplished in a single step. The step of combining may be further defined as mixing, blending, and mixtures thereof. However, the step of combining is not limited to mixing and blending. In one embodiment, the step of combining may be further defined as dry blending the first polyamide resin, the second polyamide resin, the transition metal, and the lubricant. It is contemplated that the step of combining may still alternatively include extruding in a compound extruder or melt-kneading at temperatures between 180° C. and 380° C., in any of Bumbury mixers, rubber rollers, kneaders, single-screw and/or double-screw extruders and the like. Most preferably, the first polyamide resin, the second polyamide resin, the transition metal, and the lubricant are combined in a vessel, such as a mixing device or blender, and dry blended. The first polyamide resin, the second polyamide resin, the transition metal, and the lubricant may be combined in any order, in any proportion provided the components are present, and in any number of steps. Most preferably, the first polyamide resin, the second polyamide resin, and the transition metal are initially combined in a vessel followed by addition of the lubricant. However, the method is not limited to such an order of combination.

Before the first polyamide resin, the second polyamide resin, the transition metal, and the lubricant are combined, the method may include the step of polymerizing a first amino alkanoic acid to provide the first polyamide and/or the step of polymerizing a second amino alkanoic acid to provide the second polyamide. The first and/or second alkanoic acids may include, but are not limited to, 6-aminohexanoic acid. For descriptive purposes only, a chemical structure of 6-aminohexanoic acid is shown below:

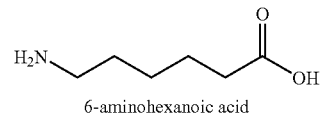
6-aminohexanoic acid

Also for descriptive purposes only, a chemical polymerization reaction of 6-aminohexanoic acid to form a polyamide is shown below:

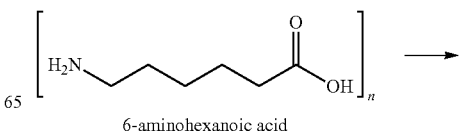
6-aminohexanoic acid

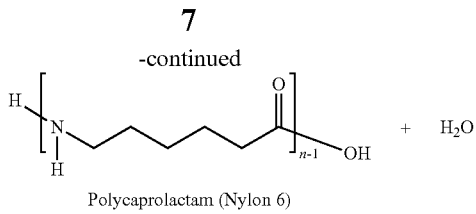

Polycaprolactam (Nylon 6)

wherein n is a number of two or greater.

Further, the method may include the step of reacting a first lactam with water to form the first amino alkanoic acid and/or the step of reacting a second lactam with water to form the second amino alkanoic acid. The first and/or second lactam may be any known in the art and preferably includes caprolactam. The caprolactam may be formed by any method known in the art such as from reaction of cyclohexanone through a Beckmann rearrangement. For descriptive purposes only, a chemical structure of caprolactam is shown below:

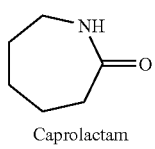

Caprolactam

Also for descriptive purposes only, a chemical reaction of caprolactam with water to form 6-aminohexanoic acid is shown below:

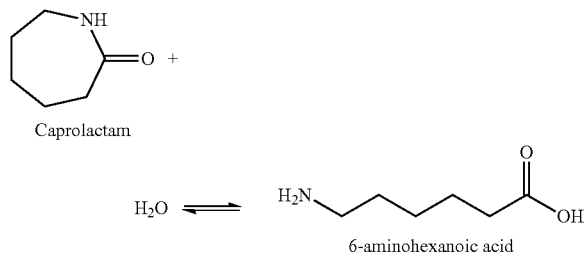

As such, a polyamide resin may be formed from the following chemical reaction:

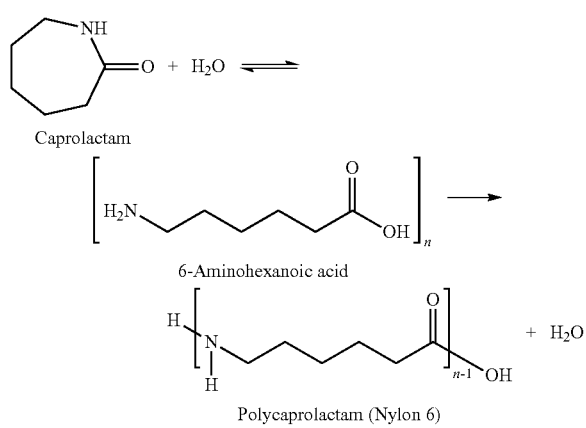

wherein n is an integer of two or greater

Alternatively, the method may include the step of polymerizing an amino acid, a lactam, a diamine, and/or a dicarboxylic acid to form the first and/or second polyamide resins. Non-limiting examples of amino acids, lactams, diamine, and dicarboxylic acids which may be used in the instant invention include, but are not limited to, 6-aminocaproic acid, 11-aminoundecanoic acid, 12-aminododecanoic acid, para-aminomethylbenzoic acid, ε-aminocaprolactam, ω-laurolactam, tetramethylenediamine, hexamethylenediamine, 2-methylpentamethylenediamine, nonanemethylenediamine, undecamethylenediamine, dodecamethylenediamine, 2,2,4-/2,4,4-trimethylhexamethylenediamine, 5-methylnonamethylenediamine, metaxylenediamine, paraxylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, adipic acid, suberic acid, azelaic acid, sebacic acid, dodecane-diacid, terephthalic acid, isophthalic acid, 2-chloroterephthalic acid, 2-methylterephthalic acid, 5-methylisophthalic acid, 5-sodium-sulfoisophthalic acid, hexahydroterephthalic acid, hexahydroisophthalic acid, and mixtures thereof.

EXAMPLES

A series of compositions (Compositions 1 and 2) are formed according to the instant invention. Specifically, amounts of the First Polyamide Resin, the Second Polyamide Resin, the Third Polyamide Resin, the Transition Metal, and the Lubricant (i.e., Silicone Oil and N,N'-ethylenebis(stearamide) wax) are added to a vessel and mixed via a compound extrusion method to form the Compositions 1 and 2, as set forth in Table 1 below. The compound extrusion method includes employing a ¾ inch multipurpose screw at temperatures slightly above the melting point of nylon 6. Additionally, a Comparative Composition is formed but not according to the instant invention, as also set forth in Table 1 below. The Comparative Composition includes the Second Polyamide Resin, the Transition Metal in the Third Polyamide Resin, N,N'-ethylenebis(stearamide) wax, and Polycaprolactam flakes, and is formed by mixing each of these components via the compound extrusion method. This compound extrusion method is the same as described above. In Table 1, all parts are in parts by weight unless otherwise indicated.

TABLE 1

|  | Composition 1 | Composition 2 | Comparative Composition |
|---|---|---|---|
| First Polyamide Resin | 25.6 | 25.6 | — |
| Second Polyamide Resin | 73.5 | 73.5 | ~95 |
| Polycaprolactam Flakes | — | — | ~5 |
| Transition Metal in Third Polyamide Resin | 0.67 | 0.67 | <500 ppm |
| Silicone Oil (ppm) | 400 | 400 | — |
| N,N'-ethylenebis(stearamide) wax | — | 800 ppm | <0.5 wt % |
| Moisture | Balance | Balance | Balance |

The First Polyamide Resin is a polycaprolactam (Nylon 6) having an extractable fraction of nylon 6 oligomer of at least one percent as determined by ISO 6427.

The Second Polyamide Resin is a polycaprolactam (Nylon 6) having a relative viscosity of greater than 3, as determined by ISO 307 calculated by the Huggins method.

The Transition Metal is copper.

The Third Polyamide Resin is a polycaprolactam (Nylon 6) having a relative viscosity of greater than 2.4, as determined by ISO 307 calculated by the Huggins method.

After formation, samples of each of the Compositions 1 and 2 and the Comparative Composition are introduced into a parallel plate rheometer and tested to determine their rheological properties, i.e., the quantitative and qualitative relationships between the derivatives of deformations and stresses. Specifically, samples of each of the Compositions 1 and 2 and the Comparative Composition are introduced into the parallel plate rheometer including two 25 mm parallel plates. After introduction, the samples are allowed to melt at 250° C. for 5 minutes. After 5 minutes, the gap between the two parallel plates is adjusted to 1150 microns and any excess of the samples is evacuated from the rheometer. Subsequently, the samples are allowed to equilibrate at 250° C. for 5 minutes. Following, the gap is adjusted to 1100 microns and measurements at 5% strain are started. Each of the samples is exposed to a 5% strain at a frequency range of 500 to 0.1 rad/sec. The results of the rheological determinations are set forth in Table 2 below.

Additionally, samples of each of the Compositions 1 and 2 the Comparative Composition are tested to determine an amount of oligomers present, via HPLC using external caprolactam and cyclic dimer standards. The results of the determinations of the rheological properties and of the Amount of Oligomers are also set forth in Table 2 below.

TABLE 2

|  | Composition 1 | Composition 2 | Comparative Composition |
|---|---|---|---|
| Frequency (rad/sec) | 0.5 | 0.5 | 0.5 |
| Viscosity (Pa · sec) | 543.3 | ~500-525 | ~540 |
| Percent of Oligomers | ~1.0 | ~1.0 | 0.054 |

The rheological measurements and the measurement of the Amount of Oligomers indicate that the Compositions 1 and 2 exhibit a similar viscosity as compared to the Comparative Composition and an increased amount of oligomers as compared to the Comparative Composition. The increased amount of oligomers is thought to allow the Compositions 1 and 2 to perform equally well, if not better than, the Comparative Composition relative to flexibility and other physical properties. Also, the Compositions 1 and 2, and the compositions of the instant invention, are less expensive to produce than the Comparative Composition thus saving production costs.

Additionally, samples of Composition 1 and the Comparative Composition are tested via Dynamic Mechanical Analysis (DMA) to determine physical properties at both low and high temperatures. Specifically, the samples are tested according to ASTM 5279-01. The DMA tests demonstrate that the Composition 1 and the Comparative Composition exhibit identical curves of storage modulus G' (MPa) as a function of temperature. This confirms that the Composition 1 has at least equal performance properties as compared to the Comparative Composition. Additionally, as first described above, the Composition 1 is less expensive to produce than the Comparative Composition and therefore provides cost savings.

Obviously, many modifications and variations of the present invention are possible in light of the above teachings. The invention may be practiced otherwise than as specifically described within the scope of the appended claims.

What is claimed is:

1. A resin composition having an extractable fraction of nylon 6 oligomer of from 2.5 to 5.5 percent as determined by ISO 6427 and comprising:
   A. a first polyamide resin having an extractable fraction of nylon 6 oligomer of at least one percent as determined by ISO 6427 and a relative viscosity of from 2.2 to 2.7 as determined by ISO 307;
   B. a second polyamide resin different from said first polyamide resin and having a relative viscosity of from 3 to 3.5 as determined by ISO 307;
   C. a transition metal; and
   D. a lubricant.

2. A composition as set forth in claim 1 wherein said first polyamide resin has an extractable fraction of at least 10 percent as determined by ISO 6427.

3. A composition as set forth in claim 2 wherein said first polyamide resin has an extractable fraction of from 11 to 14 percent as determined by ISO 6427.

4. A composition as set forth in claim 1 wherein said second polyamide resin has a relative viscosity of from 3 to 3.3 as determined by ISO 307.

5. A composition as set forth in claim 1 wherein said first polyamide resin is present in an amount of from 22 to 28 parts by weight per 100 parts by weight of said composition.

6. A composition as set forth in claim 5 wherein said second polyamide resin is present in an amount of from 70 to 75 parts by weight per 100 parts by weight of said composition.

7. A composition as set forth in claim 1 wherein said second polyamide resin is present in an amount of from 70 to 75 parts by weight per 100 parts by weight of said composition.

8. A composition as set forth in claim 1 wherein said transition metal comprises copper.

9. A composition as set forth in claim 1 wherein said transition metal is present in an amount of from 0.4 to 0.8 parts by weight per 100 parts by weight of said composition.

10. A composition as set forth in claim 1 wherein said lubricant is selected from the groups of fatty acids, silicones, and mixtures thereof.

11. A composition as set forth in claim 1 wherein said lubricant is present in an amount of from 400 to 1,200 parts by weight per one million parts by weight of said composition.

12. A composition as set forth in claim 1 further comprising a third polyamide resin different from said first and second polyamide resins.

13. A composition as set forth in claim 1 wherein said first polyamide resin has an extractable fraction of from 11 to 14 percent as determined by ISO 6427 and is present in an amount of from 22 to 28 parts by weight per 100 parts by weight of said composition.

14. A composition as set forth in claim 13 wherein said second polyamide resin has a relative viscosity of from 3 to 3.3 as determined by ISO 307 and is present in an amount of from 70 to 75 parts by weight per 100 parts by weight of said composition.

15. A composition as set forth in claim 14 further comprising a third polyamide resin different from said first and second polyamide resins, and wherein said transitional metal comprises copper and is present in an amount of from 0.4 to 0.8 parts by weight per 100 parts by weight of said composition, and said lubricant is selected from the group of fatty acids, silicones, and mixtures thereof and is present in an amount of from 400 to 1,200 parts by weight per one million parts by weight of said composition.

16. A film formed from said polyamide resin composition set forth in claim 1.

17. A method of preparing a composition having an extractable fraction of nylon 6 oligomer of from 2.5 to 5.5 percent as determined by ISO 6427, said method comprising the steps of providing a first polyamide resin having an extractable fraction of nylon 6 oligomer of at least one percent as determined by ISO 6427 and a relative viscosity of from 2.2 to 2.7 as determined by ISO 307, and combining the first polyamide resin, a second polyamide resin different from the first polyamide resin and having a relative viscosity of from 3 to 3.5 as determined by ISO 307, a transition metal, and a lubricant.

18. A method as set forth in claim 17 wherein the step of providing the first polyamide resin comprises polymerizing a first amino alkanoic acid to form the first polyamide.

19. A method as set forth in claim 18 further comprising the step of reacting a first lactam with water to form the first amino alkanoic acid.

20. A method as set forth in claim 17 further comprising the step of polymerizing a second amino alkanoic acid to form the second polyamide.

21. A method as set forth in claim 20 further comprising the step of reacting a second lactam with water to form the second amino alkanoic acid.

22. A method as set forth in claim 17 wherein the second polyamide resin is provided by polymerizing a second amino alkanoic acid.

23. A method as set forth in claim 17 wherein the step of combining is further defined as dry blending.

24. A method as set forth in claim 17 wherein the step of combining comprises the step of adding the lubricant to an initial combination of the first polyamide resin, the second polyamide resin, and the transition metal.

25. A resin composition having an extractable fraction of caprolactam of from 2.5 to 5.5 percent as determined by ISO 6427 and comprising:
   A. a first polycaprolactam having an extractable fraction of caprolactam of greater than 10 percent as determined by ISO 6427 and a relative viscosity of from 2.2 to 2.7 as determined by ISO 307;
   B. a second polycaprolactam different from the first polycaprolactam and having a relative viscosity of from 3 to 3.5 as determined by ISO 307;
   C. a transition metal; and
   D. a fatty acid.

26. A composition as set forth in claim 25 wherein said first polycaprolactam has an extractable fraction of from 11 to 14 percent as determined by ISO 6427 and is present in an amount of from 22 to 28 parts by weight per 100 parts by weight of said composition.

27. A composition as set forth in claim 26 wherein said second polycaprolactam has a relative viscosity of from 3 to 3.3 as determined by ISO 307 and is present in an amount of from 70 to 75 parts by weight per 100 parts by weight of said composition.

28. A composition as set forth in claim 27 further comprising a third polycaprolactam different from said first and second polycaprolactams, wherein said transitional metal comprises copper and is present in an amount of from 0.4 to 0.8 parts by weight per 100 parts by weight of said composition, and said lubricant is selected from the group of fatty acids, silicones, and mixtures thereof and is present in an amount of from 400 to 1,200 parts by weight per one million parts by weight of said composition.

29. A film formed from said polyamide resin composition set forth in claim 27.

\* \* \* \* \*